United States Patent
Okuda (10) Patent No.: US 10,026,531 B2
(45) Date of Patent: Jul. 17, 2018

(54) R-T-B BASED ALLOY POWDER, COMPOUND FOR ANISOTROPIC BONDED MAGNET AND ANISOTROPIC BONDED MAGNET

(71) Applicant: TDK CORPORATION, Tokyo (JP)

(72) Inventor: Nobuhiro Okuda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 1088 days.

(21) Appl. No.: 14/354,702

(22) PCT Filed: Oct. 11, 2012

(86) PCT No.: PCT/JP2012/076271
§ 371 (c)(1),
(2) Date: Apr. 28, 2014

(87) PCT Pub. No.: WO2013/061784
PCT Pub. Date: May 2, 2013

(65) Prior Publication Data
US 2014/0341774 A1 Nov. 20, 2014

(30) Foreign Application Priority Data

Oct. 28, 2011 (JP) ................. 2011-236613
Oct. 3, 2012 (JP) ................. 2012-221186

(51) Int. Cl.
| H01F 1/057 | (2006.01) |
| C22C 38/10 | (2006.01) |
| C22C 38/12 | (2006.01) |
| B22F 1/00 | (2006.01) |
| C22C 33/02 | (2006.01) |
| C22C 38/00 | (2006.01) |
| B82Y 30/00 | (2011.01) |
| B22F 3/22 | (2006.01) |

(52) U.S. Cl.
CPC .......... *H01F 1/0571* (2013.01); *B22F 1/0018* (2013.01); *B82Y 30/00* (2013.01); *C22C 33/0278* (2013.01); *C22C 38/001* (2013.01); *C22C 38/005* (2013.01); *C22C 38/10* (2013.01); *C22C 38/12* (2013.01); *H01F 1/0578* (2013.01); *B22F 3/225* (2013.01)

(58) Field of Classification Search
CPC ....... C22C 38/10; C22C 38/12; C22C 38/001; C22C 38/005; H01F 1/0571; H01F 1/0578
USPC ............... 420/83; 148/302; 252/62.55, 62.57
See application file for complete search history.

(56) References Cited

U.S. PATENT DOCUMENTS

2013/0009736 A1  1/2013  Honkura et al.

FOREIGN PATENT DOCUMENTS

| JP | A-2001-115220 | 4/2001 |
| JP | A-2003-286548 | 10/2003 |
| WO | WO 2011/070847 A1 | 6/2011 |

OTHER PUBLICATIONS

International Search Report issued in International Patent Application No. PCT/JP2012/076271 dated Jan. 22, 2013.
Written Opinion issued in International Patent Application No. PCT/JP2012/076271 dated Jan. 22, 2013 (with translation).

*Primary Examiner* — Helene Klemanski
(74) *Attorney, Agent, or Firm* — Oliff PLC (57) ABSTRACT

The present invention provides R-T-B based alloy powders, wherein R represents at least one rare earth element, and T represents at least one element selected from the group consisting of ferrum and cobalt. The R-T-B based alloy powders have main phase grains, grain boundary phases and additive phases. The main phase grains are composed of $R_2T_{14}B$ and have an average grain size of 200 nm or more and 500 nm or less. The grain boundary phases are richer in R than the main phase grains. With respect to any cross section of the R-T-B based alloy powders, the coverage of the main phase grains defined by equation 1 with the grain boundary phases with a roundness defined by equation 2 being 0.1 or more and 0.6 or less, is 10% or more and 40% or less.

$$\text{coverage} = \frac{\sum_i l_i}{\sum_j L_j} \quad \langle\text{equation 1}\rangle$$

$l_i$: Circumference of each grain boundary phase $L_j$: Circumference of each main phase grain $$\text{Roundness} = \sqrt{4\pi A/L^2} \quad \langle\text{equation 2}\rangle$$

A represents the area of the cross section of the grain boundary phase, and L represents the circumference of the cross section of the grain boundary phase.

9 Claims, 4 Drawing Sheets

R-T-B BASED ALLOY POWDER, COMPOUND FOR ANISOTROPIC BONDED MAGNET AND ANISOTROPIC BONDED MAGNET

The present invention relates to R-T-B based alloy powders, the compound for anisotropic bonded magnets which contains the R-T-B based alloy powders, and the anisotropic bonded magnets.

BACKGROUND

Recently, the automobiles or various electric devices are required to save energy and the motors provided on them need to possess a high efficiency and also need to be downsized. Thus, it will be necessary to develop magnets which are smaller in size and have higher magnetic forces.

It is known that the rare earth based magnet composed of rare earth element-containing R-T-B based alloys has the most powerful magnetic force presently. The rare earth based bonded magnet obtained by mixing the alloy powders and the resins and then subjecting the mixture to the molding process can be formed into any shape. Thus, this kind of magnet is easier to be molded as sheets and then used in small sized motors. Up to now, isotropic alloy powders are mainly used. However, the rare earth based bonded magnet with a higher magnetic force is under development which is obtained by using anisotropic alloy powders.

However, the rare earth based bonded magnets are hardly used in motors which work under hot environments, such as the motor used in the engine compartment of the automobiles. One of the reasons is that the coercivity of the alloy powders used in the rare earth based bonded magnets is not high enough that serious demagnetization happens at a high temperature. If the rare earth based bonded magnet can be used in a hot environment within a car, it promises to play a big role in the energy saving.

The method for preparing the R-T-B based anisotropic alloy powders for the rare earth based bonded magnets includes the HDDR method in which the hydrogenation process, decomposition process, desorption process and recombination process are performed in order. With the HDDR method, the orientation of the original crystallographic axis in the alloy raw materials can be maintained while the crystal grains can be micronized to a size of several hundreds of nanometers. In this way, anisotropic alloy powders can be obtained with high coercivity.

During the preparation of the alloy powders with the HDDR method, the preparation conditions can be adjusted to improve the magnetic properties of the alloy powders. For example, it is suggested in Patent Document 1 that the reaction rate can be changed by controlling the atmosphere during the desorption process and recombination process so as to improve the magnetic properties of the alloy powders. That is, the reaction rate in the recombination process can be adjusted by controlling the releasing rate of hydrogen during the desorption process so that alloy powders can be obtained with a high coercivity.

PATENT DOCUMENTS

Patent Document 1: JP2001-115220

SUMMARY

If only the atmosphere during the desorption and recombination process is under control as disclosed in Patent Document 1, the microstructure of the R-T-B based alloy powders cannot be well controlled, especially the structure of the grain boundary phases which separate the main phase grains from each other. In this respect, R-T-B based alloy powders with a sufficiently high coercivity cannot be prepared.

The present invention has been completed based on the problems mentioned above. The objective of the present invention is to provide R-T-B based alloy powders which can be used to prepare permanent magnets with good magnetic properties by controlling the microstructure of the R-T-B based alloy powders especially the structure of the grain boundary phases which separate the main phase gains from each other. Also, the present invention aims to provide the compound for anisotropic bonded magnets which uses the R-T-B based alloy powders and to provide the anisotropic bonded magnets.

To achieve the goal set above, the present invention provides R-T-B based alloy powders (R represents at least one rare earth element, and T represents at least one element selected from the group consisting of ferrum and cobalt). The R-T-B based alloy powders consist of main phase grains, grain boundary phases and additive phases. The main phase grains are composed of $R_2T_{14}B$ and have an average grain size of 200 nm or more and 500 nm or less. The grain boundary phases are richer in R than the main phase grains. The additive phases contain at least one selected from the group consisting of C, N, O, Al, Si, Ti, V, Cr, Mn, Ni, Cu, Zn, Ga, Zr, Nb, Mo, In, Sn, Hf, Ta, W and other inevitable elements. With respect to any cross section of the R-T-B based alloy powders, when the ratio of the sum of circumference of the boundary phases to that of the main phase grains is defined by equation 1 as the coverage, the coverage of the main phase grains with the grain boundary phases with a roundness defined by equation 2 being 0.1 or more and 0.6 or less, is 10% or more and 40% or less.

$$\text{coverage} \equiv \frac{\sum_i l_i}{\sum_j L_j} \quad \langle \text{equation 1} \rangle$$

$l_i$: Circumference of each grain boundary phase $L_j$: Circumference of each main phase grain $$\text{Roundness} = \sqrt{4\pi A/L^2} \quad \langle \text{equation 2} \rangle$$

$A$ represents the area of the cross section of the grain boundary phase, and $L$ represents the circumference of the cross section of the grain boundary phase.

With the R-T-B based alloy powders having the structure of the present invention, the R-T-B based alloy powders with excellent magnetic properties especially a high coercivity can be obtained.

Further, the R-T-B based alloy powders of the present invention is obtained by using alloy raw materialss. The alloy raw materials consists of $R_xT_yB_z$ (x, y and z satisfy the following relationships of the mass ratios, $28.0 \leq x \leq 36.0$, $62.0 \leq y \leq 71.0$, $1.0 \leq z \leq 1.5$) and at least one element selected from the group consisting of C, N, O, Al, Si, Ti, V, Cr, Mn, Ni, Cu, Zn, Ga, Zr, Nb, Mo, In, Sn, Hf, Ta, W and other inevitable elements. With such alloy raw materials, the R-rich grain boundary phases can be formed which have a roundness of 0.1 or more and 0.6 or less and are enough to cover 10% or more and 20% or less of the whole circumferences of the main phase grains at any cross section of the R-T-B based alloy powders.

In addition, the present invention provides a compound for the anisotropic bonded magnet, wherein the compound contains the anisotropic R-T-B based alloy powders mentioned above and resin(s). The compound for the anisotropic bonded magnet contains anisotropic R-T-B based alloy powders with excellent magnetic properties especially an excellent coercivity. In this respect, an anisotropic magnet with excellent magnetic properties especially an excellent coercivity can be prepared by using the compound for the anisotropic bonded magnet of the present invention.

The present invention further provides an anisotropic bonded magnet, wherein this anisotropic bonded magnet uses the anisotropic R-T-B based alloy powders or the compound which contains the alloy powders. The anisotropic bonded magnet of the present invention contains anisotropic R-T-B based alloy powders with excellent magnetic properties especially an excellent coercivity and is molded in the magnetic field, so it possesses a powerful magnetic force.

According to the present invention, R-T-B based alloy powders with excellent magnetic properties especially a high coercivity can be provided. In addition, an anisotropic bonded magnet with excellent magnetic properties especially excellent coercivity and residual magnetic flux density as well as the compound for the anisotropic bonded magnet can be obtained by containing highly anisotropic R-T-B based alloy powders.

DETAILED DESCRIPTION OF EMBODIMENTS

Hereinafter, the embodiments of the preparation method for the R-T-B based alloy powders of the present invention (referred to as "embodiments") and the examples of the same will be described in detail with reference to the drawings. However, the present invention is not limited to the following embodiments and examples. Further, the constituent elements disclosed in these embodiments and examples could contain elements easily thought of by those skilled in the art, elements which are substantially the same and elements covering the same scope. In addition, the constituent elements disclosed in the following embodiments and examples can be appropriately combined or can be properly selected for use.

<R-T-B Based Alloy Powders>

The R-T-B based alloy powders of the present embodiment will be described. The R-T-B based alloy powders of the present embodiment is a kind of R-T-B based alloy powders (R represents at least one rare earth element, and T represents at least one element selected from the group consisting of ferrum and cobalt). The R-T-B based alloy powders consist of main phase grains, grain boundary phases and additive phases. The main phase grains are composed of $R_2T_{14}B$ and have an average grain size of 200 nm or more and 500 nm or less. The grain boundary phases are richer in R than the main phase grains, The additive phases contain at least one selected from the group consisting of C, N, O, Al, Si, Ti, V, Cr, Mn, Ni, Cu, Zn, Ga, Zr, Nb, Mo, In, Sn, Hf, Ta, W and other inevitable elements. With respect to any cross section of the R-T-B based alloy powders, when the ratio of the sum of circumference of the boundary phases to that of the main phase grains is defined by equation 1 as the coverage, the coverage of the main phase grains with the grain boundary phases with a roundness defined by equation 2 being 0.1 or more and 0.6 or less, is 10% or more and 40% or less.

$$\text{coverage} \equiv \frac{\sum_i l_i}{\sum_j L_j} \quad \langle\text{equation 1}\rangle$$

$l_i$: Circumference of each grain boundary phase $L_j$: Circumference of each main phase grain $$\text{Roundness} = \sqrt{4\pi A/L^2} \quad \langle\text{equation 2}\rangle$$

A represents the area of the cross section of the grain boundary phase, and

L represents the circumference of the cross section of the grain boundary phase.

In the R-T-B based alloy powders of the present embodiment, R represents at least one rare earth element as mentioned above. The rare earth element refers to Sc, Y and lanthanides of IIIB in long periods of the periodic table, and the lanthanides include La, Ce, Pr, Nd, Sm, Eu, Gd, Tb, Dy, Ho, Er, Tm, Yb, Lu and the like. Also, the rare earth elements are divided into the light rare earth elements and heavy rare earth elements. The heavy rare earth element refers to Gd, Tb, Dy, Ho, Er, Tin, Yb and Lu, and the light rare earth element refers to the other rare earth elements. In view of the preparation cost and the magnetic properties, the R in this embodiment contains Nd.

As mentioned above, T represents at least one element selected from the group consisting of ferrum and cobalt. If part of ferrum is replaced with cobalt, the magnetic properties will not deteriorate while the temperature properties can be improved. The content of cobalt is preferably 20 mass % or less of that of ferrum. The reason is as follows. If ferrum is replaced by cobalt with the content of cobalt being more than 20 mass % of ferrum, the magnetic properties will deteriorate and the cost will be higher. In addition, in the present embodiment, B represents boron. Part of the boron can be replaced with C.

The R-T-B based alloy powders of the present embodiment contain in the main phase grains the $R_2T_{14}B$ phase represented by the formula $R_2T_{14}B$. The average grain size of the main phase grains is 200 nm or more and 500 nm or less. If the average particle size is less than 200 nm, the direction of magnetization of the main phase grains comes into the superparamagnetism state (which will reverse randomly) with the heat fluctuation, leading to a lower coercivity. If the average grain size is larger than 500 nm, magnetic walls are likely to appear in the main phase grains, resulting in a lowered coercivity. The average grain size of the main phase preferably ranges from 220 nm to 400 nm, and more preferably from 240 nm to 300 nm.

Further, the R-T-B based alloy powders contain grain boundary phases being richer in R than the main phase grains. The content of R in the grain boundary phases is more than that in the main phase grains by 1.1 folds or more. Sometimes, the $R_{1.1}T_4B_4$ phase is contained.

The R-T-B based alloy powders of the present embodiment further contain the additive phase. The additive phase contains 20 mass % or more of at least one element selected from the group consisting of C, N, O, Al, Si, Ti, V, Cr, Mn, Ni, Cu, Zn, Ga, Zr, Nb, Mo, In, Sn, Hf, Ta, W and other inevitable elements. Most of the additive phases are segregated among the main phase grains, which would inhibit the grain growth of the main phase grains or take the effect of wall pinning.

In the R-T-B based alloy powders of the present embodiment, with respect to any cross section of the R-T-B based alloy powders, when the ratio of the sum of circumference of the boundary phases to that of the main phase grains is defined by equation 1 as the coverage, the coverage of the main phase grains with the grain boundary phases with a roundness defined by equation 2 being 0.1 or more and 0.6 or less, is 10% or more and 40% or less.

$$\text{coverage} \equiv \frac{\sum_i l_i}{\sum_j L_j} \quad \langle \text{equation 1} \rangle$$

$l_i$: Circumference of each grain boundary phase
$L_j$: Circumference of each main phase grain $$\text{Roundness} = \sqrt{4\pi A/L^2} \quad \langle \text{equation 2} \rangle$$

$A$ represents the area of the cross section of the grain boundary phase, and
$L$ represents the circumference of the cross section of the grain boundary phase.

When the average grain size of the main phase grains is 200 nm or more and 500 nm or less, the coercivity inducement mechanism involves not only the magnetization rotation type of grains with a single magnetic domain but also the wall pinning type. With such a structure that the coverage of the main phase grains with the long and thin-shaped grain boundary phases having a roundness of 0.1 or more and 0.6 or less is 10% or more, the grain boundary phases can be pinned by the magnetic wall effectively, so a high coercivity can be obtained. If the roundness of the grain boundary phases is less than 0.1, the thickness of the grain boundary phases is thinner than that of the magnetic walls as the grain boundary phases are too long and thin in shape. In this respect, the magnetic wall pinning cannot be realized. On the contrary, if the roundness of the grain boundary phases is larger than 0.6, the magnetic wall can only be pinned with "points" but not "lines" because the shape of the grain boundary phases is close to sphere, which will not improve the coercivity. Further, if the coverage of the main phase grains with the grain boundary phases with a roundness of 0.1 or more and 0.6 or less is more than 40 (upper limit) %, the residual magnetic flux density Br will decrease to a level equal to that an isotropic R-T-B alloy owns. Based on this, the coverage of the main phase grains with the grain boundary phases with a roundness of 0.1 or more and 0.6 or less is preferably 10% or more and 40% or less. In order to quantitatively estimate the distribution state of the grain boundary phases which is deemed as the pinning site for the magnetic wall, it is necessary to tell the state of the grain boundary phases relative to each main phase grain. Thus, it is suitable to use the coverage shown in <equation 1>. In addition, in order to accurately determine the relationship between the coverage shown in <equation 1> and the coercivity, only the grain boundary phases that effectively exert the effect as the pinning sites for the magnetic walls should be considered in the calculation. The grain boundary phases functioning as the pinning sites are those which have a long and thin shape and can pin the magnetic walls with "lines". To quantitatively represent such a shape, the roundness shown in <equation 2> is preferred.

Figure 1:
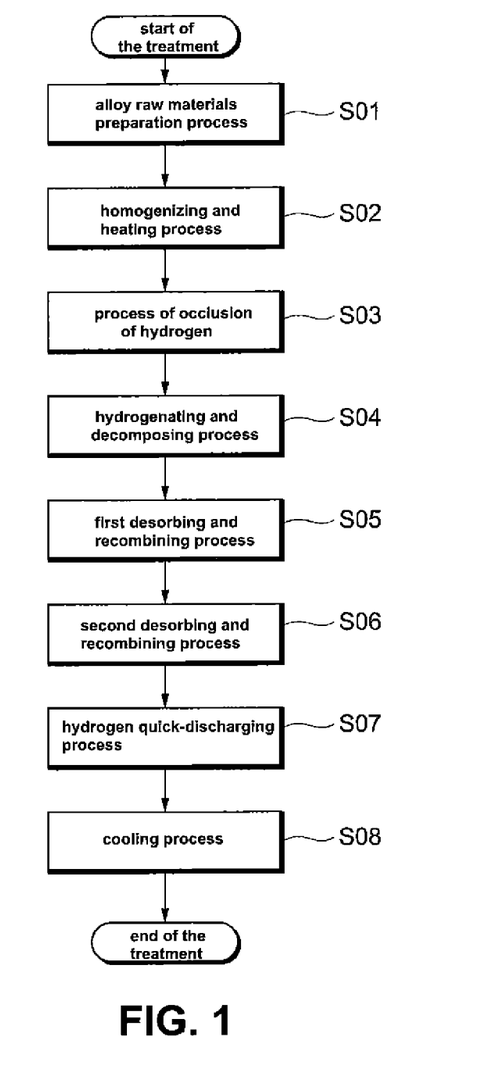
FIG. 1 is a flow chart showing the preparation process for the R-T-B based alloy powders.

Hereinafter, the preferable method for preparing the R-T-B based alloy powders in the embodiments of the present invention will be described with reference to the drawings. In the present embodiment, the R-T-B based alloy powders are prepared by the HDDR method. In the HDDR method, the starting materials (alloy raw materials) are heated in hydrogen to execute hydrogenation, decomposition (HD), followed by desorption and recombination (DR). In this way, the grains are micronized so that the R-T-B based alloy powders are obtained. FIG. 1 is a flow chart showing the preparation process for the R-T-B based alloy powders in the first embodiment of the present invention. As shown in FIG. 1, the method for preparing the R-T-B based alloy powders in the present embodiment comprises 8 steps. Specifically, these steps are the alloy raw materials preparation process (step S01) in which the alloy raw materials are obtained by casting the $R_2T_{14}B$ phase-containing R-T-B based alloys; the homogenizing and heating process (step S02) in which the alloy raw materials are heated to a temperature around the melting point and then be homogenized; the process of occlusion of hydrogen (step S03) in which the hydrogen are occluded to the alloy raw materials; the hydrogenating and decomposing process (the HD process) (step S04) in which the alloy raw materials with the occluded hydrogen are hydrogenated and decomposed to get the decomposed product; the desorbing and recombining process (the DR process) (step S05 to 07) in which hydrogen is released from the decomposed products to decrease the concentration of hydrogen in the decomposed products and then rare earth based alloy powders are obtained; and the cooling process (step S08) in which the rare earth based alloy powders are cooled down to the room temperature.

The $R_2T_{14}B$ phase-containing R-T-B based alloys can be used as the alloy raw materials. In order to get R-T-B based alloy powders with excellent magnetic properties, the $R_xT_yB_z$ (x, y and z satisfy the following relationships of the mass ratios, 28.0≤x≤36.0, 62.0≤y≤71.0, 1.0≤z≤1.5) alloy raw materials is preferably used as the alloy raw materials. R represents at least one rare earth element selected from the group consisting of Y, La, Ce, Pr, Nd, Sm, Gd, Td, Dy, Ho, Er, Tm, Lu and the like. T can be Fe or the transition metal element(s) containing at least one of Fe and Co. T can be only Fe or Fe with part of it replaced by Co. The additive element may contain at least one element selected from the group consisting of C, N, O, Al, Si, Ti, V, Cr, Mn, Ni, Cu, Zn, Ga, Zr, Nb, Mo, In, Sn, Hf, Ta, W and the like.

By using the alloy raw materials with such a composition, the R-rich grain boundary phases can be formed with a roundness of 0.1 or more and 0.6 or less and with its content sufficient to cover 10% or more and 40% or less of the total circumferences of the main phase grains at any cross section of the R-T-B based alloy powders.

<Alloy Raw Materials Preparation Process: Step S01>

The alloy raw materials preparation process (step S01) is a process in which the alloy raw materials are obtained by casting $R_2T_{14}B$ phase-containing R-T-B based alloys. The casting method can be the ingot cast, the strip cast, the book mold or the centrifugal casting. The alloy raw materials may also contain inevitable impurities derived from the metal raw materials or starting materials or the preparation processes. After prepared, the alloy raw materials are transferred to the homogenizing and heating process (step S02).

<Homogenizing and Heating Process: Step S02>

The homogenizing and heating process (step S02) is a process in which the alloy raw materials are heated to a temperature near the melting point and the alloy raw materials are homogenized. The alloy raw materials are kept at a temperature of 1000° C. or more and 1200° C. or less under vacuum or inert atmosphere such as Ar atmosphere or $N_2$ atmosphere for 5 hours to 48 hours. In this way, the alloy raw materials are homogenized. Then, the homogenized alloys are transferred to the process of occlusion of hydrogen (step S03). In addition, the homogenizing and heating process (step S02) is contained in the present embodiment. However, the present embodiment is not limited thereto. The homogenizing and heating process (step S02) can be omitted depending on the casting conditions and the like of the alloy raw materials.

<Occlusion of Hydrogen Process: Step S03>

The process of occlusion of hydrogen (step S03) is a process in which the hydrogen is occluded in the alloy raw materials. In this stage, the hydrogen is only occluded in the crystal lattices of the alloy raw materials, and the alloy raw materials will not be decomposed by the occluded hydrogen. In the process of occlusion of hydrogen (step S03), the alloy raw materials are kept at a temperature $T_1$ under the hydrogen atmosphere with its partial pressure $P_1$ for a period $t_1$ so that the hydrogen is occluded in the alloy raw materials. The hydrogen partial pressure $P_1$ is preferably 100 kPa or more and 300 kPa or less. The temperature $T_1$ is preferably 100° C. or more and 200° C. or less. The time $t_1$ is preferably 0.5 hour to 2 hours. By setting the hydrogen partial pressure $P_1$, the temperature $T_1$ and the time $t_1$ to the ranges mentioned above, the hydrogen may be occluded in the crystal lattices of the alloy raw materials.

If the hydrogen partial pressure $P_1$ is lower than 100 kPa, the crystal lattice of the alloy raw materials can hardly occlude the hydrogen. If the hydrogen partial pressure $P_1$ is higher than 300 kPa, the size of the devices will be enlarged with the addition of structures for explosion-proof or the like.

If the temperature $T_1$ is higher than 200° C., the crystal lattice of the alloy raw materials can hardly occlude the hydrogen. If the temperature $T_1$ is lower than 100° C., the crystal lattice of the alloy raw materials cannot occlude the hydrogen, either.

If the time $t_1$ is longer than 2 hours, the amount of the hydrogen occluded will be saturated in the alloy raw materials. If the time $t_1$ is shorter than 0.5 hour, the alloy raw materials cannot sufficiently occlude hydrogen.

<Hydrogenating and Decomposing (HD) Process: Step S04>

The HD process (step S04) is a process in which the alloy raw materials with the occluded hydrogen are hydrogenated and decomposed to get the decomposed product. The decomposed product obtained by decomposing the alloy raw materials in the HD reaction comprises hydrides such as $RH_x$ or the like and iron compounds such as α-Fe and $Fe_2B$ or the like. The decomposed product forms a fine substrate with several hundreds of nanometers. In the HD process (step S04), the alloy raw materials with the occluded hydrogen are kept at a temperature $T_2$ (which is higher than $T_1$) under the hydrogen atmosphere with hydrogen partial pressure being $P_2$ for a period $t_2$.

The hydrogen partial pressure $P_2$ is preferably 10 kPa or more and 100 kPa or less. The temperature $T_2$ is preferably 700° C. or more and 850° C. or less. The hydrogenating and decomposing process is performed in a furnace with the hydrogen partial pressure $P_2$ and the temperature $T_2$ being set as mentioned above, and the decomposed product can be obtained accordingly.

If the hydrogen partial pressure $P_2$ is lower than 10 kPa, the hydrogenation and decomposition processes may not be performed sufficiently. If the hydrogen partial pressure $P_2$ is higher than 100 kPa, the reaction rate of hydrogenation and decomposition is too quick that the anisotropy of the R-T-B based alloy powders will deteriorate.

If the temperature $T_2$ is lower than 700° C., the hydrogenation and decomposition may not be sufficiently performed. If the temperature $T_2$ is higher than 850° C., it is hard to get the decomposed product (the hydride).

The time $t_2$ is preferred to be 0.5 hour or more and 10 hours or less. If the time $t_2$ is shorter than 0.5 hours, the hydrogenation and decomposition may not be sufficiently performed. If the time $t_2$ is longer than 10 hours, the hydrogenation and decomposition is performed to an excessive level, leading to a lowered anisotropy of the R-T-B based alloy powders.

<Desorbing and Recombining (DR) Process: Step S05>

The DR process (step S05~S07) is a process in which the hydrogen is released from the decomposed products, the decomposed products are recombined and then the R-T-B based alloy powders are obtained. In the present embodiment, the DR process includes the first DR process (step S05), the second DR process (step S06) and the hydrogen quick-discharging process (step S07). In the present embodiment, the DR process consists of the first DR process, the second DR process and the hydrogen quick-discharging process. However, the present invention is not limited thereto. That is, the DR process can be done in one stage or four or more stages.

(First Desorbing and Recombining (DR) Process: Step S05)

The first DR process (step S05) is a process done at a temperature $T_3$ for a period $t_3$ in which the hydrogen is released until the concentration of hydrogen in the decomposed products becomes η and the recombination core for the R-T-B based alloys is generated.

In order to generate the core for the R-T-B based alloy more evenly, the concentration of hydrogen η of the decomposed product in the first DR process (step S05) is preferably 0.28 mass % to 0.30 mass %.

The first DR temperature $T_3$ of the decomposed product in the first DR process (step S05) is preferably 750° C. or more and 950° C. or less, and more preferably 800° C. or more and 900° C. or less. By setting the temperature of the decomposed products as the first DR temperature $T_3$ (which is higher than the temperature $T_2$), the hydrogen is more easily to release from the decomposed products so that the core for the rare earth based alloy can be formed more evenly.

If the first DR temperature $T_3$ is lower than 750° C., the releasing rate of hydrogen from the decomposed product cannot be fast enough and some hydrogen remains. On the other hand, if the first DR temperature $T_3$ is higher than 950° C., abnormal growth will happen to the crystal grains of the rare earth based alloy powders.

The time $t_3$ in the first DR process (step S05) is preferably, for example, 0.05 hour to 0.2 hour and can be appropriately adjusted depending on the releasing rate of hydrogen from the decomposed products.

(Second Desorbing and Recombining (DR) Process: Step S06)

The second DR process (step S06) is a process performed at the second DR temperature $T_4$ for a period $t_4$ in which hydrogen is further released from the decomposed product with the releasing rate of hydrogen from the decomposed products slower than that in the first DR process (step S05) and then the decomposed products are recombined slowly so that the crystal grains of the R-T-B based alloy are allowed to grow.

The temperature $T_4$ in the second DR process (step S06) is preferably set to be the same as temperature $T_3$ in the first DR process (step S05). In this respect, hydrogen can be successfully released from the decomposed products.

The releasing rate of hydrogen in the second DR process (step S06) is preferred to be one percent to one tenth of that in the first DR process (step 05).

Figure 2:
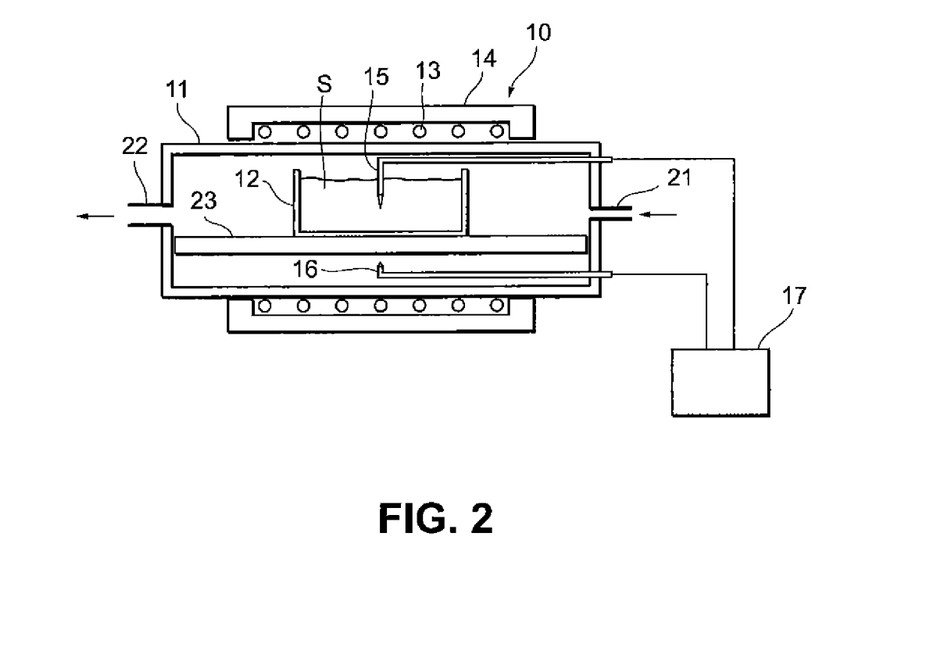
FIG. 2 is a drawing showing an example of the configuration of the furnace used in the HDDR method of the present embodiment.

The second DR process (step S06) proceeds until the recombination reaction of the decomposed products terminates. The terminating point of the recombination reaction can be specified by the way(s) described below in the present embodiment. FIG. 2 is a drawing showing an example of the configuration of the furnace used in the HDDR method. As shown in FIG. 2, the furnace 10 comprises the main body 11, treatment container 12, heater 13, heat barrier material 14, thermometers 15 and 16, and temperature tester 17. The furnace 10 has a gas inlet 21 and a gas outlet 22 on the wall. In the furnace 10, inert gases or $H_2$ gas are supplied to the inside of the main body 11 via the gas inlet 21 and the inert gas can be Ar gas or $N_2$ gas or the like. In addition, the gases inside the main body 11 are discharged from the furnace 10 via the gas outlet 22 to control the pressure. Further, a hearth 23 is provided in the inside of the main body 11, and the treatment container 12 is arranged on the hearth 23. The main body 11 has the heater 13 arranged on its peripheral region. The heater 13 is covered by the heat barrier material 14. The thermometer 15 is inserted into the decomposed products S accommodated in the treatment container 12, and the thermometer 16 is installed inside the main body 11. The thermometers 15 and 16 respectively connect to the temperature tester 17. The temperature tester 17 measures the temperature of the decomposed products S via the thermometer 15 and determines the temperature inside the main body 11 via the thermometer 16. The temperature of the decomposed product S measured by the thermometer 15 is set as the sample temperature Ti and the temperature of the inside atmosphere of the main body 11 measured by the thermometer 16 is set as the atmosphere temperature T2.

The sample temperature Ti is maintained at around 850° C. On the other hand, for the atmosphere temperature T2, the time when a peak is reached can be determined (referred to as the "peak point A"). This peak point A relates to the change of the atmosphere temperature T2 with the increased heat output of the furnace as the recombination process of the DR reaction is completed.

In the DR process, the DR process for the hydride of R ($RH_2$) contained in the alloy raw materials is performed as shown in formula (1). Specifically, the reaction shown in formula (1) is actually the combination of desorption process (formula (2)) which is an endothermic reaction and the recombination process (formula (3)) which is an exothermic reaction. The DR reaction of formula (1) is an endothermic reaction in total. Q1 in formula (1) is the difference between Q2 in formula (2) and Q3 in formula (3).

$$RH_2 + 6Fe + \tfrac{1}{2}Fe_2B \rightarrow \tfrac{1}{2}R_2Fe_{14}B + H_2 - Q1 \quad (1)$$

$$RH_2 \rightarrow R + H_2 - Q2 \quad (2)$$

$$R + 6Fe + \tfrac{1}{2}Fe_2B \rightarrow \tfrac{1}{2}R_2Fe_{14}B + Q3 \quad (3)$$

When the recombination reaction of the DR process is terminated, only the endothermic reaction of formula (2) continues and the exothermic reaction of formula (3) stops. Thus, more heat is consumed, and the heat output of the furnace is increased to prevent the sample temperature from decreasing. In this respect, the atmosphere temperature T2 inside the furnace rises. The time point when the atmosphere temperature reaches the peak value can be determined as the point when the recombination reaction of the DR process terminates. In other words, the point when the recombination reaction of the DR process terminates can be actually determined, The time $t_4$ in the second DR process (step S06) is preferably, for example, 0.5 hour to 5 hours and can be adjusted properly depending on the releasing rate of hydrogen from the decomposed products.

(Hydrogen Quick-Discharging Process: step S07)

The hydrogen quick-discharging process (step S07) is a process performed at a temperature $T_5$ for a period $t_5$ in which the hydrogen partial pressure is decreased and designated as $P_5$ and the hydrogen remained in the R-T-B based alloy is discharged at one time. $T_5$ is preferred to be the same as $T_4$. The time $t_5$ should be as short as possible, and it is preferable that the hydrogen partial pressure inside the furnace reaches $P_5$ at least within 5 minutes. Further, $P_5$ is preferred to be lower than 100 Pa. In the present embodiment, at the end point of the recombination reaction of the second DR process (step S06), the decreasing rate of the hydrogen partial pressure $P_4$ is elevated.

The desorption reaction and the recombination reaction happen during the DR process. When the recombination reaction completes, the main phase grains and the grain boundary phases are formed in the R-T-B based alloy powders. As the temperature $T_4$ is about 850° C., the grain boundary phases are formed in liquid. If the decreasing rate of the hydrogen partial pressure is remained as that in the second DR process, it will take a longer time until the desorption reaction completes. Thus, the grain boundary phase in liquid is concentrated at the triple junction point among the main phase grains and come into a state with a roundness close to 1. Therefore, the decreasing rate of the hydrogen partial pressure should be elevated quickly at the terminate point of the recombination reaction of the DR process so that the desorption reaction will complete as soon as possible. In this respect, the grain boundary phases are prevented from concentrating at the triple junction point so as to forme grain boundary phases with a roundness of 0.1 or more and 0.6 or less. Also, the coercivity HcJ of the obtained rare earth based alloy powders can be further improved.

<Cooling Process: Step S09>

The cooling process (step S09) is a process in which the R-T-B based alloy powders obtained in the HDDR reaction are cooled down to room temperature with the inert gases for cooling. The inert gas can be, for example, Ar gas, $N_2$ gas and the like. The supply of the inert gases is stopped after the rare earth based alloy powders obtained in the HDDR reaction is cooled to room temperature by said inert gases. In this way, the rare earth based alloy powders are obtained. The R-T-B based alloy powders prepared by these processes mentioned above possess high coercivity The obtained R-T-B based alloy powders are further subjected to the pulverization process and prepared as R-T-B based alloy powders with (a particle size of) 50 μm to 300 μm or less. The R-T-B based alloy powders are preferably pulverized by using a stamp mill or a jaw crusher and then screened and classified.

With respect to the R-T-B based alloy powders of the present embodiment, after the recombination reaction terminates, the grain boundary phases are prevented from concentrating at the triple junction point and forms to have a roundness of 0.1 or more and 0.6 or less. Thus, the R-T-B based alloy powders with high coercivity HcJ can be obtained by using the HDDR method.

The R-T-B based alloy powders can be used as the magnet powders for the anisotropic bonded magnet to prepare a permanent magnet with high coercivity HcJ.

The coverage of the main phase grains with the grain boundary phases with a roundness of 0.1 or more and 0.6 or less can be controlled by, for example, changing the composition of the rare earth elements in the alloy raw materials. When the rare earth elements account for 28.0 mass % or more and 36.0 mass % or less, the grain boundary phases with a roundness of 0.1 or more and 0.6 or less cover 10% or more and 40% or less of the total circumferences of the main phase grains. If the rare earth elements in the alloy raw materials account for less than 28.0 mass %, the formed grain boundary phases are not enough to cover at least 10% of the superficial area of the main phase grains so that the coercivity is not high. If the rare earth elements in the alloy raw materials account for more than 36.0 mass %, over 40% of the superficial area of the main phase grains will be covered by the grain boundary phases. In this case, although the coverage with the grain boundary phases is increased, the magnetic force of the R-T-B based alloy powders will also decrease.

Furthermore, the coverage of the main phase grains with the grain boundary phases with a roundness of 0.1 or more and 0.6 or less can be controlled based on the treatment conditions in the HDDR reaction. For example, the coverage with the grain boundary phases can be increased if the temperature $T_2$ is elevated in the HD process (step S04).

Although the R-T-B based alloy powders of the present embodiment is prepared by the HDDR method, the present invention is not limited thereto. For example, an R-rich film can be formed by sputtering at the surface of the $R_2T_{14}B$ grains which are prepared by the gas atomization method and have an average grain size of 200 nm or more and 500 nm or less. In this respect, the R-T-B based alloy powders can be prepared in which the grain boundary phases with a roundness of 0.1 or more and 0.6 or less cover 10% or more and 40% or less of the total circumferences of the main phase grains at any cross section of the R-T-B based alloy powders.

Because of the high coercivity HcJ, the R-T-B based alloy powders of the present embodiment can be used even at a high temperature. Thus, the R-T-B based alloy powders are preferably be used as the alloy powders for magnets which are used at hot environments such as those used in the engine compartment of a car.

<Rare Earth Based Bonded Magnet>

The rare earth based bonded magnet is obtained by molding the compound (composition) for the rare earth based bonded magnets into specified shapes, wherein the compound (composition) is obtained by mixing the resin-containing resin binders and the magnet powders. During the molding process, the rare earth based bonded magnet can be prepared to be anisotropic or isotropic. The isotropic rare earth based bonded magnet is obtained by molding the compound for the rare earth based bonded magnet (the compound containing R-T-B based alloy powders) without the application of a magnetic field. The anisotropic rare earth based bonded magnet is obtained by orienting the crystallographic axis of the R-T-B based alloy powders contained in the compound mentioned above in a specific direction under an applied magnetic field.

An example of the production method for the rare earth based bonded magnet will be described. The resin-containing resin binders and the R-T-B based alloy powders are mixed by a pressurized mixing mill such as a pressurized kneader so as to prepare the compound (composition) for the rare earth based bonded magnets. The resin includes the thermosetting resins such as epoxy resin, phenolic resin and the like; or styrene-based, olefin-based, polyurethane-based, polyester-based, polyamide-based elastomers; thermoplastic resins such as ionomer, ethylene-propylene polymer (EPM), ethylene-ethyl acrylate copolymer, polyphenylene sulfide (PPS) and the like. Of these, the resin used in compression molding is preferably the thermosetting resin and more preferably the epoxy resin or the phenolic resin. In addition, the resin used in the injection molding is preferably the thermoplastic resin. Further, if desired, the coupling agent or other additives can be added in the compound for the rare earth based bonded magnet.

For the ratios of the R-T-B based alloy powders and the resins contained in the rare earth based bonded magnet, it is preferred that 0.5 mass % or more and 20 mass % or less of resins are contained based on 100 mass % of R-T-B based alloy powders. Based on 100 mass % of rare earth based alloy powders, if the content of the resins is less than 0.5 mass %, the shape-keeping property tends to lose. If the resins account for more than 20 mass %, it is hard to obtain excellent magnetic properties.

After the preparation of the compound for the rare earth based bonded magnet, by subjecting the compound for the rare earth based bonded magnet to the injection molding, a rare earth based bonded magnet can be obtained which contains the R-T-B based alloy powders and resins. If the rare earth based bonded magnet is prepared by injection molding, the compound for the rare earth based bonded magnet is heated to the melting temperature of the binder (the thermoplastic resin) if needed. Then, the compound for the rare earth based bonded magnet in a flow state is subjected to the injection molding in a mold with a specified shape. After cooled down, the molded article (i.e., the rare earth based bonded magnet) with a specified shape is taken out from the mold. In this way, a rare earth based bonded magnet is yielded. The production method for the rare earth based bonded magnet is not limited to the injection molding mentioned above. For example, the compound for the rare earth based bonded magnet can also be subjected to the compression molding so as to get a rare earth based bonded magnet containing the R-T-B based alloy powders and resins. When the rare earth based bonded magnet is produced via compression molding, after prepared, the compound for the rare earth based bonded magnet is filled into a mold with a stated shape. After the application of pressures, the molded article (i.e., the rare earth based bonded magnet) with a stated shape is taken out from the mold. The pressure applied to the compound for the rare earth based bonded magnet filled in the mold can be provided by a compression molding machine such as a mechanical press or oil-pressure press and the like. Thereafter, the molded article is placed in a furnace such as a heating furnace or a vacuum drying oven or the like to cure the resins by heat so that a rare earth based bonded magnet is obtained.

The shape of the molded rare earth based bonded magnet is not particularly limited. Corresponding to the shape of the mold in use such as a tabular shape, a columnar shape and a circular shape and the like, the shape of the rare earth based bonded magnet vary accordingly. Further, with respect to the obtained rare earth based bonded magnet, in order to prevent the oxidation layer or the resin layer on the surface from deteriorating, the surface can be subjected to plating or can be coated with paints.

In the R-T-B based alloy powders of the present embodiment, the grain boundary phases can be prevented from concentrating at the triple junction point and can be formed with a roundness of 0.1 or more and 0.6 or less so that the coercivity HcJ is high. Accordingly, the rare earth based bonded magnet obtained by using these R-T-B based alloy powders could possess high coercivity HcJ.

When the compound for the rare earth based bonded magnet is formed to the intended specified shape, magnetic field is applied so that the crystallographic axis of the R-T-B based alloy powders is oriented in a specific direction. Thus, an anisotropic rare earth based bonded magnet with better magnetic performances can be obtained as the rare earth based bonded magnet is oriented in a specific direction.

The preferable embodiments of the present invention have been described above but the present invention is not limited thereto. Various modifications and combinations can be made without deflecting from the spirit of the present invention.

EXAMPLES

Hereinafter, the present invention will be described in details with reference to the Examples and Comparative Examples. However, the present invention is not limited to the following Examples.

Example 1

A Nd—Fe—B alloy raw materials with the following composition was produced by a strip cast process.
Nd: 31.8 mass %
Fe: 61.1 mass %
Co: 5.0 mass %
B: 1.3 mass %
Ga: 0.4 mass %
Nb: 0.3 mass %

Besides the elements listed above, the alloy raw materials still contained traces of inevitable impurities (which accounted for 0.1 to 0.3 mass % of the whole alloy raw materials). The alloy raw materials were kept under vacuum at a temperature of 1000 to 1200☐ for 24 hours (homogenizing and heating process). The resultant Nd—Fe—B alloy raw materials were pulverized by a stamp mill and then screened and classified so that granular alloy raw materials (with a particle size of 1 to 2 mm) were obtained.

The alloy raw materials were filled in a molybdenum-made container, and the container was put in a tubular heating furnace provided with an infrared heating system. The hydrogenation, decomposition, desorption and recombination (HDDR treatment) were performed with the following conditions. The flow chart of this treatment was as shown in FIG. 1.

First of all, hydrogen was introduced into the tubular heating furnace. The process of occlusion of hydrogen (S03 in FIG. 1) was performed that the alloy raw material powders were kept under hydrogen atmosphere (the hydrogen partial pressure is 100 kPa) at a temperature ($T_1$) of 100° C. for 2 hours. In this way, hydrogen was occluded into the alloy raw materials.

Then, the hydrogenating and decomposing process (S04 in FIG. 1) proceeded in which the alloys with the occluded hydrogen was kept under a hydrogen partial pressure of 40 kPa at a temperature $T_2$ (800° C.) for 5 hours. Thus, the alloy raw materials were hydrogenated and decomposed to get the decomposed products.

Thereafter, the temperature was raised to $T_3$ (850° C.), and the hydrogen gas was discharged by using a vacuum pump to lower the pressure inside the furnace (the hydrogen partial pressure). In this way, the hydrogen was released from the decomposed products and the recombination core was generated (the first DR process, S05 in FIG. 1).

In the first DR process, based on the mass of the whole decomposed products before the release of hydrogen, the concentration of hydrogen decreased to η (0.28 mass %). The first DR process took 4 minutes.

Once the concentration of hydrogen in the decomposed products was decreased to η, the temperature was set to be $T_4$ (850° C.) and the discharge velocity of hydrogen from the furnace was changed to one percent of that of the previous process. (This process is the second DR process, S06 in FIG. 1). The second DR process proceeded until the recombination reaction of the decomposed products terminated which lasted for about 60 minutes.

The terminating point of the recombination reaction can be specified by the way(s) described below in the present embodiment. FIG. 2 was a drawing showing the configuration of the furnace used in the HDDR method. The sample temperature T1 was measured by the thermometer 15 and the atmosphere temperature T2 inside the furnace was measured by the thermometer 16. The sample temperature T1 was controlled by setting the temperature in each process of the HDDR reaction at a constant level.

In the DR process, the recombination reaction which was an exothermic reaction and the desorption reaction which was an endothermic reaction were performed. If the recombination reaction was terminated, only the desorption reaction which was an endothermic reaction was continued and the exothermic reaction stopped. Thus, more heat was consumed, and the heat output of the furnace was increased to prevent the sample temperature from decreasing. In this respect, the atmosphere temperature T2 inside the furnace raised. Thus, the time point when the atmosphere temperature T2 reached the peak value can be determined as the termination point of the recombination reaction of the DR process.

At the point when the recombination reaction terminated, the valves arranged on the gas outlet were all opened to increase the discharge velocity of hydrogen. It took about 5 minutes before the pressure inside the furnace become lower than 100 Pa.

When the pressure (hydrogen partial pressure) inside the furnace was lower than 100 Pa, the hydrogen discharge was stopped. Then, the inside of the furnace was cooled to room temperature (about 20° C.) so as to yield anisotropic Nd—Fe—B alloy powders treated by HDDR.

[Evaluation of the Magnetic Properties]

The obtained Nd—Fe—B alloy powders were pulverized by a mortar under inert atmosphere and then screened and classified so that Nd—Fe—B alloy powders were prepared with a particle size of 53 to 212 μm. These powders and paraffin were put in a chamber. A magnetic field of 1 Tesla was applied when the paraffin was melted so that the Nd—Fe—B alloy powders were oriented. Then a pulse magnetic field of 6 Tesla was provided in a direction parallel to the orientation direction of the alloy powders. A vibrating sample magnetometer (VSM) was used to test the magnetization-magnetic field curve so as to determine the magnetic properties. The coercivity (HcJ) was measured to be 19.3 kOe.

[Evaluation of Grain Boundary Phases]

Figure 3:
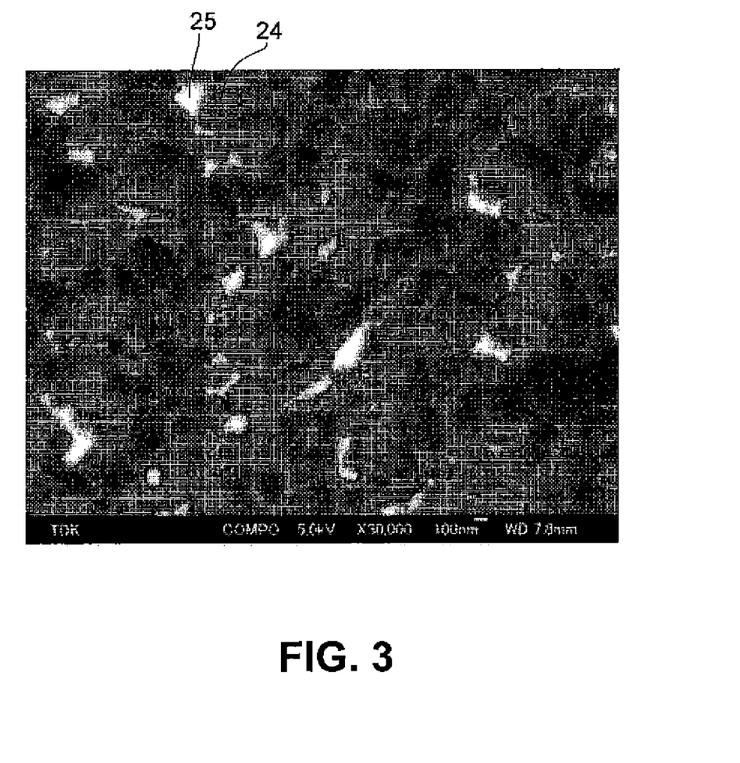
FIG. 3 is a SEM image showing a cross section of the R-T-B based alloy powders of the present embodiment.
Figure 4:
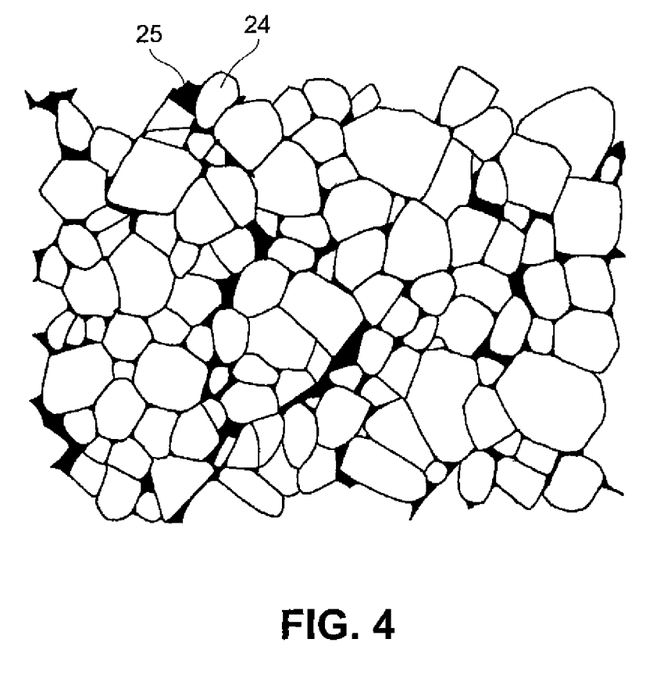
FIG. 4 is a drawing taken from the SEM image of FIG. 3, showing the main phase grains and the grain boundary phases.

The Nd—Fe—B alloy powders obtained from the process mentioned above were buried into the epoxy resins and subjected to a grinding process to prepare a sample for observation of microstructure. The sample for observation was used to observe the structure of the main phase grains and the grain boundary phases in the Nd—Fe—B alloy powders via an FE-SEM backscattered electron image. The result was shown in FIG. 3. The grey parts were the main phase and the white parts were the grain boundary phases. These parts were extracted to form the black-white image as shown in FIG. 4. With an image software, the circumferences at the cross section of the main phase grains as well as the roundness at the cross section of the grain boundary phases were estimated. Deviations were always there for the shapes or the distribution states of the main phase grains or the grain boundary phases depending on the types of the Nd—Fe—B powders, and a two-dimensional image was used to evaluate the shapes of three-dimensioned main phase grains or the grain boundary phases here. Thus, as more main phase grains or grain boundary phases as possible should be observed and evaluated. In this respect, 5 different sites were taken for the backscattered electron images with a field of vision being about 3 μm×4 μm (about 100 or more main phase grains were included in each site) to get the average values.

The coverage defined in equation 1 was calculated as the ratio of the sum of the circumferences at the cross section of the grain boundary with a roundness of 0.1 or more and 0.6 or less to the sum of the circumferences at the cross section of the main phase grains. The value was 17.5%. In addition, the coverage with respect to the grain boundary phases with a roundness of smaller than 0.1 or larger than 0.6 was calculated to be 12.1%.

$$\text{coverage} \equiv \frac{\sum_i l_i}{\sum_j L_j} \quad \langle \text{equation 1} \rangle$$

$l_i$: Circumference of each grain boundary phase $L_j$: Circumference of each main phase grain Example 2

The Nd—Fe—B alloy powders were obtained as in Example 1 except the alloy raw materials had the following composition.

Nd: 29.8 mass %
Fe: 63.1 mass %
Co: 5.0 mass %
B: 1.2 mass %
Ga: 0.4 mass %
Nb: 0.3 mass %

The evaluation of the microstructure was performed as in Example 1. As a result, the ratio of the main phase grains covered by the grain boundary phases with a roundness of 0.1 or more and 0.6 or less was 12.2%. In addition, 12.3% of main phase grains were covered by the grain boundary phases with a roundness of smaller than 0.1 or larger than 0.6. The coercivity of the Nd—Fe—B powders was 17.9 kOe.

Example 3

The Nd—Fe—B alloy powders were obtained as in Example 1 except the alloy raw materials had the following composition.

Nd: 28.1 mass %
Fe: 64.9 mass %
Co: 5.0 mass %
B: 1.1 mass %
Ga: 0.4 mass %
Nb: 0.3 mass %

The evaluation of the microstructure was performed as in Example 1. As a result, the ratio of the main phase grains covered by the grain boundary phases with a roundness of 0.1 or more and 0.6 or less was 10.1%. In addition, 12.1% of main phase grains were covered by the grain boundary phases with a roundness of smaller than 0.1 or larger than 0.6 The coercivity of the Nd—Fe—B powders was 16.7 kOe.

Example 4

The Nd—Fe—B alloy powders were obtained as in Example 1 except the alloy raw materials had the following composition.

Nd: 33.7 mass %
Fe: 59.0 mass %
Co: 5.0 mass %
B: 1.4 mass %
Ga: 0.3 mass %

The evaluation of the microstructure was performed as in Example 1. As a result, the ratio of the main phase grains covered by the grain boundary phases with a roundness of 0.1 or more and 0.6 or less was 21.5%. In addition, 12.0% of main phase grains were covered by the grain boundary phases with a roundness of smaller than 0.1 or larger than 0.6. The coercivity of the Nd—Fe—B powders was 20.5 kOe.

Example 5

The Nd—Fe—B alloy powders were obtained as in Example 1 except the interval between the termination of the recombination reaction and the start of the cooling process was 0.5 minute.

The evaluation of the microstructure was performed as in Example 1. As a result, the ratio of the main phase grains covered by the grain boundary phases with a roundness of 0.1 or more and 0.6 or less was 26.7%. In addition, 9.8% of main phase grains were covered by the grain boundary phases with a roundness of smaller than 0.1 or larger than 0.6. The coercivity of the Nd—Fe—B powders was 21.2 kOe.

Example 6

The Nd—Fe—B alloy powders were obtained as in Example 4 except the interval between the termination of the recombination reaction and the start of the cooling process was 0.5 minute.

The evaluation of the microstructure was performed as in Example 1. As a result, the ratio of the main phase grains covered by the grain boundary phases with a roundness of 0.1 or more and 0.6 or less was 32.3%. In addition, 9.6% of main phase grains were covered by the grain boundary phases with a roundness of smaller than 0.1 or larger than 0.6. The coercivity of the Nd—Fe—B powders was 23.5 kOe.

Example 7

The Nd—Fe—B alloy powders were obtained as in Example 6 except the alloy raw materials had the following composition.
Nd: 35.5 mass %
Fe: 57.2 mass %
Co: 5.0 mass %
B: 1.5 mass %
Ga: 0.4 mass %
Nb: 0.3 mass %

The evaluation of the microstructure was performed as in Example 1. As a result, the ratio of the main phase grains covered by the grain boundary phases with a roundness of 0.1 or more and 0.6 or less was 37.4%. In addition, 9.5% of main phase grains were covered by the grain boundary phases with a roundness of smaller than 0.1 or larger than 0.6. The coercivity of the Nd—Fe—B powders was 25.2 kOe.

Comparative Example 1

The Nd—Fe—B alloy powders were obtained as in Example 2 except the interval between the termination of the recombination reaction and the start of the cooling process was 10 minute.

The evaluation of the microstructure was performed as in Example 1. As a result, the ratio of the main phase grains covered by the grain boundary phases with a roundness of 0.1 or more and 0.6 or less was 8.0%. In addition, 15.8% of main phase grains were covered by the grain boundary phases with a roundness of smaller than 0.1 or larger than 0.6. The coercivity of the Nd—Fe—B powders was 16.1 kOe.

Comparative Example 2

The Nd—Fe—B alloy powders were obtained as in Example 2 except the interval between the termination of the recombination reaction and the start of the cooling process was 40 minute.

The evaluation of the microstructure was performed as in Example 1. As a result, the ratio of the main phase grains covered by the grain boundary phases with a roundness of 0.1 or more and 0.6 or less was 6.9%. In addition, 22.7% of main phase grains were covered by the grain boundary phases with a roundness of smaller than 0.1 or larger than 0.6. The coercivity of the Nd—Fe—B powders was 15.6 kOe.

Comparative Example 3

The Nd—Fe—B alloy powders were obtained as in Example 4 except the interval between the termination of the recombination reaction and the start of the cooling process was 60 minute.

The evaluation of the microstructure was performed as in Example 1. As a result, the ratio of the main phase grains covered by the grain boundary phases with a roundness of 0.1 or more and 0.6 or less was 7.4%. In addition, 27.5% of main phase grains were covered by the grain boundary phases with a roundness of smaller than 0.1 or larger than 0.6. The coercivity of the Nd—Fe—B powders was 15.9 kOe.

Comparative Example 4

The Nd—Fe—B alloy powders were obtained as in Example 6 except the alloy raw materials had the following composition.
Nd: 37.9 mass %
Fe: 54.6 mass %
Co: 5.0 mass %
B: 1.6 mass %
Ga: 0.4 mass %
Nb: 0.3 mass %

The evaluation of the microstructure was performed as in Example 1. As a result, the ratio of the main phase grains covered by the grain boundary phases with a roundness of 0.1 or more and 0.6 or less was 42.1%. In addition, 10.5% of main phase grains were covered by the grain boundary phases with a roundness of smaller than 0.1 or larger than 0.6. The coercivity of the Nd—Fe—B powders was 27.7 kOe.

TABLE 1

|  | Interval between the termination of the recombination reaction and the start of the cooling process (min) | Coverage with the total grain boundary phases (%) | Coverage with the grain boundary phases with a roundness of 0.1 or more and 0.6 or less (%) | Coverage with the grain boundary phases with a roundness of smaller than 0.1 or larger than 0.6 (%) | Br (kG) | Hcj (kOe) | Hk/Hcj (%) |
|---|---|---|---|---|---|---|---|
| Example 1 | 5 | 29.6 | 17.5 | 12.1 | 11.9 | 19.3 | 37.4 |
| Example 2 | 5 | 24.5 | 12.2 | 12.3 | 12.9 | 17.9 | 49.5 |
| Example 3 | 5 | 22.2 | 10.1 | 12.1 | 13.6 | 16.7 | 55.4 |
| Example 4 | 5 | 33.5 | 21.5 | 12.0 | 10.2 | 20.5 | 32.3 |
| Example 5 | 0.5 | 36.5 | 26.7 | 9.8 | 11.1 | 21.2 | 44.9 |
| Example 6 | 0.5 | 42.0 | 32.3 | 9.6 | 9.9 | 23.5 | 39.5 |
| Example 7 | 0.5 | 46.9 | 37.4 | 9.5 | 9.2 | 25.2 | 35.3 |
| Comparative Example 1 | 10 | 23.8 | 8.0 | 15.8 | 13.5 | 16.1 | 54.7 |
| Comparative Example 2 | 40 | 29.6 | 6.9 | 22.7 | 13.4 | 15.6 | 53.6 |
| Comparative Example 3 | 60 | 34.9 | 7.4 | 27.5 | 8.7 | 15.9 | 33.0 |
| Comparative Example 4 | 0.5 | 52.5 | 42.1 | 10.5 | 6.7 | 27.7 | 30.3 |

As shown in Table 1, the Nd—Fe—B alloy powders prepared by the HDDR method in which a quick-discharging process is provided in the second DR process (step S06) between the termination of the recombination reaction and the start of the cooling process which lasts for 5 minutes or less (Example 2 or 4) had a higher coverage with the grain boundary phases with a roundness of 0.1 or more and 0.6 and less (the coverage was 12.2% in Example 2 while it was 8.0% in Comparative Example 1 and 6.9% in Comparative Example 2; the coverage was 21.5% in Example 4 while it was 7.4% in Comparative Example 3) and improved coercivity (the coercivity was 17.9 kOe in Example 2 while it was 16.1 kOe in Comparative Example 1 and 15.6 kOe in Comparative Example 2; the coercivity was 20.5 kOe in Example 4 while it was 15.9 kOe in Comparative Example 3) compared to those which had the same composition and were prepared by process with the interval between the recombination reaction and the cooling process being 10 minutes or longer (Comparative Example 1, 2 or 3).

Furthermore, with respect to the Nd—Fe—B alloy powders prepared by the HDDR method in which a quick-discharging process is provided in the second DR process (step S06) between the termination of the recombination reaction and the start of the cooling process which lasts for 5 minutes or less, compared to those with a relatively high content of Nd (for example, Example 1), if the content of Nd was relatively small (Example 3), the formation of the grain boundary phases with a roundness of 0.1 or more and 0.6 or less was not sufficient (the ratio of such grain boundary phases was 17.5% in Example 1 and 10.1% in Example 3) and the coercivity was decreased (the coercivity was 19.3 kOe in Example 1 and 16.7 kOe in Example 3).

It can be known that the coverage provided by the grain boundary phases with a roundness of 0.1 or more and 0.6 or less can be improved and the coercivity HcJ can be elevated in the R-T-B based alloy powders prepared by the HDDR method by providing a hydrogen quick-discharging process after the termination of the recombination reaction in the second DR process (step S06).

If the coverage provided by the grain boundary phases with a roundness of 0.1 or more and 0.6 or less was higher than 40%, the content of Nd could not be increased. As a result, the residual magnetic flux density Br was decreased to a level lower than the isotropic Nd—Fe—B alloy powders (Comparative Example 4).

[Demagnetizing Factor]

The Nd—Fe—B alloy powders from Example 1, Example 7 and Comparative Example 4 (the coverage was much too high) were respectively mixed with polyphenylene sulfide resin to produce the compounds for the rare earth based bonded magnets. The compounds were heated to 330° C. and inject molded in a cylindrical mold with a size of φ10×7. During the injection molding process, a field of 1.5 Tesla was applied in the height direction of the cylinder so that the Nd—Fe—B alloy powders were oriented. Then, the prepared anisotropic rare earth based bonded magnets were subjected to magnetization. After tested for their magnetic forces by a fluxmeter, these magnets were placed in a thermostatic bath of 150° C. for 1000 hours. Thereafter, the magnetic force was measured again to get the demagnetizing factor. The results were shown in Table 2.

[Residual Flux Density]

The residual magnetic flux density of each anisotropic bonded magnet which had been tested for its demagnetizing factor was measured for the residual magnetic flux density by a B-H tracer. The results were listed in Table 2.

TABLE 2

| | Demagnetizing factor (%) | Residual flux density Br (kG) |
|---|---|---|
| Example 1 | 8 | 8.6 |
| Example 7 | 1 | 6.7 |
| Comparative Example 4 | 0 | 4.8 |

It can be known from Table 2 that the demagnetizing factor of the anisotropic bonded magnet prepared by Nd—Fe—B alloy powders obtained in the Examples was decreased to be low and the heat resistance at a high temperature was quite good. In addition, in Comparative Example 4 in which the coverage of the main phase grains with the grain boundary phases with a roundness of 0.1 or more and 0.6 or less was over 40%, despite of the low demagnetizing factor, the bonded magnet cannot be used in practice as the residual magnetic flux density Br was lower than the isotropic bonded magnets.

As mentioned above, the R-T-B based alloy powders of the present invention are useful in the preparation of rare earth based bonded magnets with a high coercivity HcJ and it will be suitable to use the prepared bonded magnets as permanent magnets.

DESCRIPTION OF REFERENCE NUMBERALS

10 furnace
11 main body of furnace
12 treatment container
13 heater
14 heat barrier material
15, 16 thermometer
17 temperature tester
21 gas inlet
22 gas outlet
23 hearth
S decomposed product
24 main phase grain
25 grain boundary phase

What is claimed is:

1. An R-T-B based alloy powder, wherein,

R represents at least one rare earth element and T represents at least one element selected from the group consisting of ferrum and cobalt, said R-T-B based alloy powders consist of main phase grains, grain boundary phases and additive phases, said main phase grains are composed of $R_2T_{14}B$ and have an average grain size of 200 nm or more and 500 nm or less, said grain boundary phases are richer in R than said main phase grains, with respect to any cross section of said R-T-B based alloy powders, when the ratio of the sum of circumference of the boundary phases to that of the main phase grains is defined by equation 1 as the coverage, the coverage of the main phase grains with the grain boundary phases with a roundness defined by equation 2 being 0.1 or more and 0.6 or less, is 10.1% or more and 37.4% or less:

$$\text{coverage} \equiv \frac{\sum_i l_i}{\sum_j L_j} \quad \langle\text{equation 1}\rangle$$

$l_i$: Circumference of each grain boundary phase $L_j$: Circumference of each main phase grain $$\text{Roundness} = \sqrt{4\pi A/L^2} \quad \langle\text{equation 2}\rangle$$

A represents the area of the cross section of the grain boundary phase, and

L represents the circumference of the cross section of the grain boundary phase.

2. The R-T-B based alloy powder of claim 1, wherein, said R-T-B based alloy powders are obtained by using alloy raw materials which consist of $R_x T_y B_z$ and at least one element selected from the group consisting of C, N, O, Al, Si, Ti, V, Cr, Mn, Ni, Cu, Zn, Ga, Zr, Nb, Mo, In, Sn, Hf, Ta, W and other inevitable elements, wherein, x, y and z satisfy the following relationships of the mass ratios, $28.0 \leq x \leq 36.0$, $62.0 \leq y \leq 71.0$, $1.0 \leq z \leq 1.5$.

3. A compound for anisotropic bonded magnet, comprising, the R-T-B based alloy powders of claim 1 and one or more resins.

4. An anisotropic bonded magnet, wherein, said anisotropic bonded magnet is obtained by using the R-T-B based alloy powder of claim 1.

5. An anisotropic bonded magnet, wherein, said anisotropic bonded magnet is obtained by using the compound for anisotropic bonded magnet of claim 3.

6. A compound for anisotropic bonded magnet, comprising, the R-T-B based alloy powders of claim 2 and one or more resins.

7. An anisotropic bonded magnet, wherein, said anisotropic bonded magnet is obtained by using the R-T-B based alloy powder of claim 2.

8. An anisotropic bonded magnet, wherein, said anisotropic bonded magnet is obtained by using the compound for anisotropic bonded magnet of claim 6.

9. The R-T-B based alloy powder of claim 1, wherein, the coverage of the main phase grains with the grain boundary phases with the roundness defined by equation 2 being 0.1 or more and 0.6 or less, is 12.2% or more and 37.4% or less.

* * * * *